United States Patent
Minamizawa

(10) Patent No.: US 6,288,791 B1
(45) Date of Patent: Sep. 11, 2001

(54) MULTIFUNCTION APPARATUS AND PICTURE SIGNAL PROCESSING METHOD BY THE SAME

(75) Inventor: Fumihiro Minamizawa, Toyoake (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/100,931

(22) Filed: Jun. 22, 1998

(30) Foreign Application Priority Data

Jun. 23, 1997 (JP) .................................................. 9-181727

(51) Int. Cl.$^7$ ............................. B41B 15/00; B41J 15/00; G06F 15/00
(52) U.S. Cl. .................. 358/1.15; 358/1.16; 358/1.17; 358/1.18; 358/1.13; 358/1.1; 358/1.9
(58) Field of Search .................................. 358/1.15, 1.16, 358/1.17, 1.18, 1.13, 1.6, 1.1, 1.9, 403, 450, 451; 382/305; 710/107; 709/226

(56) References Cited

U.S. PATENT DOCUMENTS 5,799,159 * 8/1998 Abe ....................................... 710/107
5,978,551 * 11/1999 Koyama ............................... 358/1.2

* cited by examiner

*Primary Examiner*—Edward Coles
*Assistant Examiner*—Twyler Lamb
(74) *Attorney, Agent, or Firm*—Oliff & Berridge, PLC

(57) ABSTRACT

A multifunction apparatus has a receiver that receives a picture signal and a converter that converts the picture signal received by the receiver into image data. A memory is provided for storing the image data obtained through conversion by the converter. The memory is usable also for an operation other than an operation related to the conversion by the converter unit. A detector detects an amount of memory space available in the memory. A conversion mode changer changes a mode of conversion by the converter unit, on the basis of result of the detection by the detector unit. The multifunction apparatus improves the quality of image data and efficiently and fully uses the memory, thereby reducing the memory capacity required and reducing the manufacturing costs.

19 Claims, 2 Drawing Sheets

MULTIFUNCTION APPARATUS AND PICTURE SIGNAL PROCESSING METHOD BY THE SAME

BACKGROUND OF THE INVENTION

1. Field of Invention

The invention relates to a multifunction apparatus and, more particularly, to a multifunction apparatus and a picture signal processing method used by the multifunction apparatus.

2. Description of Related Art

A known multifunction apparatus is equipped with a printing function using a laser printer or a color ink jet printer, a scanner function using a charged-couple device (CCD), a copy function, a facsimile function, a personal computer connecting function, and so on.

The multifunction apparatus has a built-in memory that stores various data corresponding to the functions. The built-in memory is used as, for example, a received facsimile data memory, a transmission facsimile data memory, a message recording memory, an answering message memory for an answering phone function, a printer buffer memory, a scanner buffer memory and an image data memory.

SUMMARY OF THE INVENTION

The invention adds, to such a multifunction apparatus, a function of receiving picture signals and performing video-capture of the signals for outputting the image obtained by the video capture to a personal computer. For picture signals, the NTSC system is widely employed. In the NTSC system, a frame is formed by two fields, with a field being a basic unit. That is, since the NTSC system employs interlace scanning, one field in the NTSC system forms a half frame.

To extract color information and brightness information from signals of the NTSC system, a finite impulse response (FIR) filter can be used. If chrominance signals are extracted from a single field in the NTSC system using an FIR filter, the low-quality problem of extracted chrominance signals arises despite the minimum memory capacity required (corresponding to a half (½) frame). That is, since a field merely forms a half frame, the resolution is low. Moreover, the processing performance of FIR filters is limited. Therefore, the extraction of chrominance signals from one field using an FIR filter suffers from low resolution and low quality due to color information extraction based on a comparison of adjacently-located color information pieces.

If a picture plane is formed from one frame, that is, two fields, chrominance signals are extracted from two fields using an FIR filter, so that the signal extraction requires a larger memory capacity than the aforementioned signal extraction from a single field. However, the required memory capacity is still relatively small (corresponding to one frame), and an intermediate image quality is achieved. Although the image quality is thus improved, the processing using the FIR filter presents limitations in resolution and quality as in the aforementioned single-field signal extraction.

In the case of a static picture image in the NTSC system, two frames, that is, four fields, may be used to form one picture plane, by extracting chrominance signals based on differentials between the two frames. Since two consecutive frames in the NTSC system shift 180° in phase, the differentials between frames makes it possible to extract chrominance signals to a great extent. Therefore, the image quality is good (owing to the frame differentials). However, a large memory capacity is necessary.

Allotting a large space of a memory to the conversion from picture signals into image data leads to inefficient use of memory because the various other functions of the multifunction apparatus also require large memory spaces. If a memory dedicated to image data is provided, the cost of the entire apparatus is very high as the memory for the picture signal processing needs to have a high speed and a large capacity.

Because it is rare that all functions operate simultaneously, it is an object of the invention to provide a multifunction apparatus that changes a mode of conversion of a picture signal into image data in accordance with the memory space that is being used for functions other than the picture signal processing, so as to efficiently use the memory, improve the image quality and reduce the manufacturing costs, while providing a picture signal processing method performed by the multifunction apparatus.

According a first aspect of the invention, there is provided a multifunction apparatus including a reception device for receiving a picture signal, and conversion device for converting the picture signal received by the reception device, into image data. A storage device is provided for storing the image data obtained through conversion by the conversion device. The storage device is usable also for an operation other than an operation related to the conversion by the conversion device. A detection device is provided for detecting an amount of memory space available in the storage device. A conversion mode changing device is provided for changing a mode of conversion by the conversion device, on the basis of the result of the detection by the detection device.

The conversion device may employ at least one of a two-frame differential mode in which color information and brightness information are extracted based on differentials between two frames, and an FIR filtering mode in which color information and brightness information are extracted using an FIR filter.

The conversion mode changing device may set the mode of conversion to one of the two-frame differential mode and the FIR filtering mode on the basis of the amount of available memory space in the storage device detected by the detection device.

The conversion mode changing device may set the mode of conversion to the two-frame differential mode if the amount of available memory space in the storage device detected by the detection device is equal to or greater than a first predetermined amount. The conversion mode changing device may also set the mode of conversion to a two-field FIR filtering mode if the amount of available memory space in the storage device detected by the detection device is less than a first predetermined amount but greater than or equal to a second predetermined amount. The conversion mode changing device may also set the mode of conversion to a one-field FIR filtering mode if the amount of available memory space in the storage device detected by the detection device is less than a second predetermined amount but greater than or equal to a third predetermined amount.

The first predetermined amount may be 806,400 bytes, the second predetermined amount may be 403,200 bytes, and the third predetermined amount may be 201,600 bytes.

The picture signal received by the receiving device may be a video signal.

According to a second aspect of the invention, there is provided a multifunction apparatus including a receiver unit that receives a picture signal and a converter unit that converts the picture signal received by the receiver unit into image data. A storage unit stores the image data obtained through conversion by the converter unit. The storage unit is usable also for an operation other than an operation related to the conversion by the converter unit. A detector unit detects an amount of memory space available in the storage unit. A conversion mode changer unit changes a mode of conversion by the converter unit, on the basis of the result of detection by the detector unit.

The conversion mode changer unit may set the mode of conversion to one of a two-frame differential mode in which color information and brightness information are extracted based on differentials between two frames, and an FIR filtering mode in which color information and brightness information are extracted using an FIR filter, on the basis of the amount of available memory space in the storage unit detected by the detector unit.

The conversion mode changer unit may set the mode of conversion to the two-frame differential mode if the amount of available memory space in the storage unit detected by the detector unit is equal to or greater than a first predetermined amount.

The conversion mode changer unit may set the mode of conversion to a two-field field FIR filtering mode if the amount of available memory space in the storage unit detected by the detector unit is less than a first predetermined amount but greater than or equal to a second predetermined amount.

The conversion mode changer unit may set the mode of conversion to a one-field field FIR filtering mode if the amount of available memory space in the storage unit detected by the detector unit is less than a second predetermined amount but greater than or equal to a third predetermined amount.

The first predetermined amount may be 806,400 bytes, the second predetermined amount may be 403,200 bytes, and the third predetermined amount may be 201,600 bytes.

The multifunction apparatus may be a facsimile apparatus comprising a printer, an image scanner, an NCU and a modem, and the receiver unit may include a video input terminal.

According to a third aspect of the invention, there is provided a picture signal processing method performed by a multifunction apparatus, including a step of receiving a picture signal, a step of converting the picture signal received into image data, a step of detecting an amount of memory space available in a memory device, and a step of changing a mode of conversion, in the converting step, on the basis of result of detection in the detecting step.

The multifunction apparatus of the invention converts picture signals into image data in a conversion mode that is selected from different modes in accordance with the amount of memory space available in the multifunction apparatus. Therefore, the conversion of picture signals into image data can be performed in an optimal mode in accordance with the memory space that is not currently used, thereby improving the efficiency in use of the memory. In contrast to an apparatus wherein a fixed memory is allocated for the processing of picture signals, the multifunction apparatus of the invention improves the picture quality by efficiently and fully using the memory capacity. In addition, because the multifunction apparatus of the invention thus reduces the memory capacity that needs to be provided in the multifunction apparatus, the production cost of the multifunction apparatus can be reduced.

The invention is applicable regardless of whether the picture signal system is the NTSC system, the PAL system, the SECOM system or other systems.

BRIEF DESCRIPTION OF THE DRAWINGS

A preferred embodiment of the invention will be described in detail with reference to the following figures wherein.

DETAILED DESCRIPTION OF PREFERRED EMBODIMENT

Figure 1:
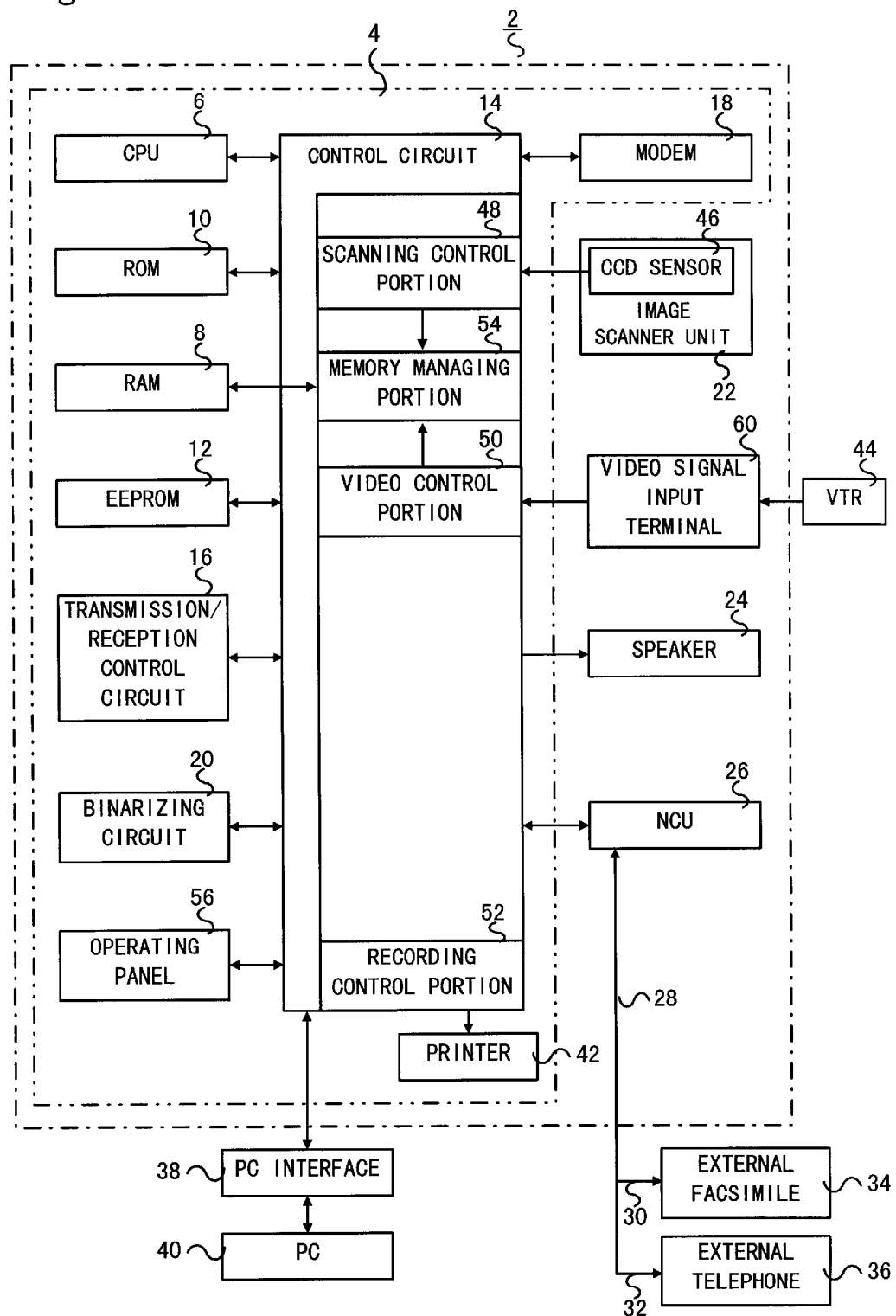
FIG. 1 is a schematic block diagram of a multifunction apparatus according to a preferred embodiment of the invention.

FIG. 1 is a schematic block diagram of a multifunction facsimile apparatus, that is, an embodiment of the multifunction apparatus of the invention.

A multifunction facsimile apparatus 2, that is, one form of the multifunction apparatus, has an operating panel 56 as shown in FIG. 1. Although not shown in the drawings, the operating panel 56 of a main body of the facsimile apparatus 2 has, in its rearward portion, a display, a FINE lamp, a SUPERFINE lamp, a remaining toner indicator and the like. Provided in a forward portion of the operating panel 56 are number keys, a start key, a stop key, a copy key and the like. Provided in an intermediate portion of the operating panel 56 are various function keys and operation keys, such as a set key, a clear key, a resolution key, a cursor key and the like.

The display indicates the present status of the facsimile apparatus 2 or an operation procedure. The number keys are operated to input the facsimile number of an external facsimile apparatus 34, shown in FIG. 1, or to select one of the functions of the facsimile apparatus 2. The start key is a key for starting a selected function. The stop key is for stopping an operating function. The copy key is a key for instructing the start of scanning a document when the facsimile apparatus 2 is used as a copier. The cursor key is operated for moving a cursor in the display, for selecting functions, or for other purposes.

The function keys are keys to instruct the start of displaying various functions that can be performed by the facsimile apparatus 2. A desired function can be selected by operating appropriate number keys, the cursor key or the like. The set key is operated to input a user's decision on a function after selection.

The resolution key is a key for selecting a resolution of an image scanner unit 22 of the facsimile apparatus 2 shown in FIG. 1. The resolution is initially set to a standard mode. With this initial setting, neither the FINE lamp nor the SUPERFINE lamp is turned on. The resolution is switched from the standard mode to a fine mode by depressing the resolution key once, and the FINE lamp is turned on. Depressing the resolution key twice sets the resolution to a superfine mode and turns on the SUPERFINE lamp. Depressing the key three times sets a half-tone mode and turns on both the FINE and SUPERFINE lamps and, further, causes the display to display the half-tone setting. The gradation level in the half tone mode can be set to predetermined gradations (for example, the 16 gradation level and the 32 gradation level) by operating function keys, number keys, the cursor key and the like. The remaining toner indicator is off when the amount of toner remaining is sufficient, flickers when the amount of toner is about to run out, and is on continuously at the time of empty.

The facsimile apparatus 2 of the embodiment has a control unit 4. The control unit 4 includes, at least, a CPU 6, and a RAM 8, a ROM 10 and an EEPROM 12 that are memories (storage devices), a control circuit 14, a transmission/reception control circuit 16, a modem 18, and a binarizing circuit 20.

The control circuit 14 has a scanning control portion 48, a video control portion 50, a recording control portion 52 and a memory managing portion 54. The recording control portion 52 is connected to a printer mechanism 42. The printer mechanism 42 may be of any type, such as a laser printer, an ink jet printer, or a toner jet printer, and may be a color printer or a monochrome printer.

The control circuit 14 has a direct memory access controller (DMAC), a latch, a parallel/serial converting circuit and the like. The DMAC performs direct data transfer (direct memory access) without intervention of the CPU 6, between the RAM 8 and the control circuit 14, and between the control circuit 14 and the side of the recording control portion 52. The DMAC outputs a transfer data request signal to the CPU 6 when a laser light is detected by a beam detector (not shown). In response, the CPU 6 sets in the DMAC the leading address of the data to be transferred and the number of bytes of the transfer data. The designated data is transferred from the RAM 8 to the control circuit 14 one byte at a time. The data is held by the latch, and serially converted by the parallel/serial converting circuit. The converted data is transferred to the side of the recording control portion 52.

Connected to the control circuit 14 are the image scanner unit 22, a speaker 24 and, further, an external line 28 through a network control unit (hereinafter, referred to as "NCU") 26. The external line 28 is connected to the external facsimile apparatus 34 and an external telephone apparatus 36 via an exchange and external lines 30, 32. The external lines 28, 30, 32 may be, for example, an ordinary subscriber telephone line, an ISDN line, a dedicated line or the like.

The binarizing circuit 20 converts scanned image data obtained by the image scanner unit 22, such as a CCD sensor 46, into binary data.

When the image scanner unit 22 scans a document by using the CCD sensor 46 while irradiating the document with light from a light source, non-uniform or irregular illumination of the document may occur (for example, a central portion of the document is brightly illuminated while a peripheral portion thereof is relatively dark). Therefore, in some cases, the output voltage of the CCD sensor 46 does not precisely correspond to the density levels of the individual pixels of the image on the document. To cope with this problem, thresholds are predetermined in accordance with illumination irregularity and the like, and stored in the form of a table in a threshold data memory of the EEPROM 12 of the facsimile apparatus 2. The transfer of threshold data from the EEPROM 12 to the control circuit 14 is also controlled by the DMAC.

Dot data is prepared as follows. The analog value of the output voltage from the image scanner unit 22, more specifically, the CCD sensor 46 or the like, is compared in magnitude with threshold data read from the EEPROM 12 (the digital value of the threshold data is converted into an analog signal by the binarizing circuit 20). If the output voltage value is greater than the threshold value, the dot data is set to "0" (white). If the output value is less than the threshold value, the dot data is set to "1" (black). If the half-tone mode is selected by operating the resolution key in the operating panel 56, the dot data conversion is performed on the basis of a dither matrix.

The transmission/reception control circuit 16 is a circuit for, when the facsimile apparatus 2 is connected to the external facsimile apparatus 34, exchanging with the external facsimile apparatus 34 traffic-related information, such as the facsimile numbers of both apparatuses and the like, and transmission parameters, such as resolution and the like.

The modem 18 has a modulating/demodulating mechanism, and thereby modulates digital signals into analog signals and outputs the signals to the external lines 28, 30, 32 through the NCU 26, and demodulates analog signals inputted through the NCU 26 into digital signals. In addition to the modulating/demodulating mechanism, the modem 18 has a voice synthesizing mechanism, a modem received data buffer, a modem transmission data buffer, and the like.

When 8-bit data is stored into the modem received data buffer of the modem 18, the data is read by the control unit 4 by an interrupt and stored into a facsimile received data buffer in the RAM 8. The capacity of the facsimile received data buffer varies depending on the space of the RAM 8 currently available. The NCU 26 automatically receives a call from the external facsimile apparatus 34 for data reception, and automatically calls the external facsimile apparatus 34 for data transmission.

The RAM 8, that is, one form of a memory (storage device), contains the facsimile received data buffer, a facsimile transmission data buffer, a scanned image data buffer, a VTR data buffer for storing A/C-converted NTSC signals, an answering-phone voice record memory, an answering-phone answer message memory, a coding buffer, a decoding buffer, a recorder input buffer, a recorder output buffer, a traffic-related information memory, a one-line dot data buffer, an external apparatus dial memory, a report record request flag, an in-transmission status flag, a transmission temporary flag, an in-recording status flag, a leading end flag, a decoding managing table, a record instruction flag, a one-page recording completion flag, a recording completion flag, a paper jam detection flag, an out-of-paper detection flag, a record-waiting flag, a re-output need flag, a no-cartridge flag, a decoding page counter, a record page counter, an in-recording line counter, a decoding managing page pointer, a record managing page pointer, a PC input data buffer, a PC data record request flag, a record temporary buffer, a record buffer, a facsimile input data buffer, a facsimile output data buffer, a facsimile data record request flag, a scanned image data record request flag, a record/transmission flag, and a transmission-only flag.

The RAM 8 further contains a recording completion data memory, a paper jam data memory, an out-of-paper data memory, and a no-cartridge data memory. Other memories or flags may be placed in the RAM 8 as needed. The program memory of the ROM 10 stores a message outputting program, an automatic report request outputting program, a report record control program, a reception interrupt program, a decoding program, interrupt A, B and C programs, a recording one-line interrupt program, a coding program, a data interrupt transmission program, a pattern memory storing patterns for converting character data into dot data, a parallel data recording program, a one-page recording starting program, a one-page recording ending program, a decoding facsimile outputting program, a recording control program in accordance with the amount of toner remaining, an interrupt program for detecting the amount of toner remaining, and an output control program in accordance with the status of the facsimile. Other programs may be installed in the ROM 10 as necessary.

The EEPROM 12 contains the aforementioned threshold data memory, a registered dial memory for storing telephone or facsimile numbers of external apparatuses to which status information regarding the facsimile apparatus 2 is transmitted, a no-cartridge flag, an out-of-toner flag, and a near out-of-toner flag.

The recording control portion 52 is connected to a device for detecting the amount of toner remaining (not shown), a recording sheet sensor, a BD sensor, an upstream sensor (leading end sensor), a downstream sensor (paper discharge sensor) and any other desired or necessary sensor, although not shown in the drawings. The recording control portion 52 is further connected to a laser light emitting portion, and a drum motor via a drive circuit. The drum motor synchronously rotates a photosensitive drum and a rotating shaft.

The control circuit 14 is connected to a personal computer (PC) 40 via an interface 38. The PC 40 receives data regarding an image inputted by operating a keyboard or other input device, and stores the data into the image data memory of the RAM 8. Recording is instructed by operating keys of the keyboard following what is displayed on the display. The image data memory of the PC 40 stores image data, such as character data, dot data and the like. The PC 40 outputs character data or dot data or the like to the facsimile apparatus 2.

The facsimile apparatus 2 structured as described above performs various operations. For example, the facsimile apparatus 2 records image data inputted from the PC 40, transmits the thus-inputted image data to an external facsimile apparatus 34, and records image data received by the external facsimile apparatus 34, and image data read by the image scanner unit 22, including image data obtained by the CCD sensor 46, image data obtained through conversion of picture signals inputted to a video signal input terminal 60 from a VTR 44, and image data corresponding to the processing traffic-related information, and the like.

The facsimile apparatus 2 of this embodiment will be further described below in conjunction with operations in which while image data inputted by the CCD sensor 46 remains in the RAM 8, color information and brightness information are extracted from NTSC signals inputted to the video signal input terminal 60 from the VTR 44, and then converted into image data, in order to simplify the description.

Figure 2:
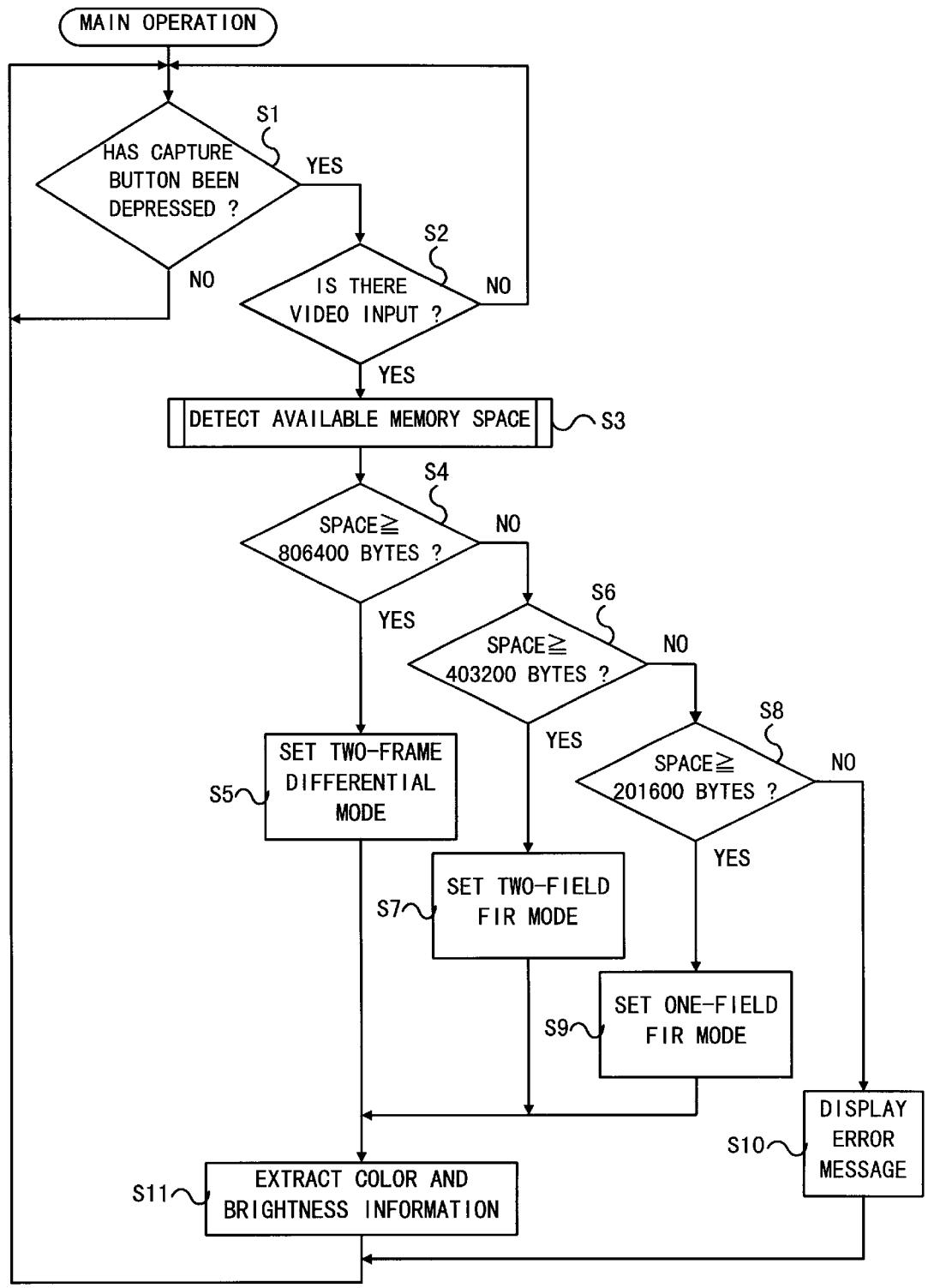
FIG. 2 is a flowchart illustrating an example of the processing regarding image conversion by the multifunction apparatus shown in FIG. 1.

FIG. 2 is a flowchart illustrating an example of the operation of extracting color information and brightness information from NTSC signals inputted to the video signal input terminal 60, and converting the extracted information into image data.

As indicated in the block diagram of FIG. 1, the CCD sensor 46 is controlled by the scanning control portion 48 of the control circuit 14. The data inputted by the CCD sensor 46 is stored into the RAM 8 through the memory managing portion 54. When the data is outputted from the RAM 8 to the printer mechanism 42, the data is outputted through the recording control portion 52. For the facsimile data output, on the other hand, the data from the RAM 8 is compressed into facsimile codes by the transmission/reception control circuit 16, and then outputted to the external facsimile apparatus 34 through the modem 18 and the NCU 26.

Described below are operations in which, while the data inputted by the CCD sensor 46 is retained in the RAM 8, color information and brightness information are extracted from NTSC signals inputted to the video signal input terminal 60, and converted into image data.

The video signal input terminal 60 is connected to the video control portion 50 so that NTSC picture signals inputted from the external VTR 44 into the video signal input terminal 60 are A/D-converted (analog-to-digital converted) by the memory managing portion 54, and the digital signals are inputted to the VTR data buffer of the RAM 8. The A/D-converted picture signals inputted to the VTR data buffer of the RAM 8 are converted into image data by a conversion method that is selected from a plurality of methods in accordance with the memory space available for video capturing (extraction of color information and brightness information).

The memory space available for video capturing (extraction of color information and brightness information) means a space obtained by subtracting space already used for other processings, from the storage area of the RAM 8. In this embodiment, since the data inputted by the CCD sensor 46 is retained in the RAM 8, the available memory space in the storage area of the RAM 8 is correspondingly reduced.

That is, the memory managing portion 54 performs management such that as many fields as possible will be subjected to the FIR filter processing in accordance with the memory space available for the video capturing of picture signals (extraction of color information and brightness information). This embodiment will be described in conjunction with an example case where one field is 240×840=201600 bytes. If the field size is 240×840=201600 bytes, the memory space required for video capturing is, for example, 240×840=201600 bytes for one field, 403200 bytes for one frame (=1 field×2), and 806400 bytes for two frames (=1 frame×2).

The embodiment will be described in conjunction with a case where the memory capacity of the RAM 8 is 1 megabyte and, of that memory capacity, 100 KB is allotted as a common area and the remaining 900 KB is used for the video capture processing and other various functions. The aforementioned common area is a basic memory area necessary to operate the various functions of the multifunction apparatus according to the invention.

The procedure of memory management performed in a case where the memory required for storing a field is as mentioned above, will be described with the flowchart of FIG. 2. Although not shown in the drawings, a capture button is provided in the operating panel 56.

In step S1, it is determined whether the capture button has been depressed. If the capture button has been depressed (YES in step S1), it is subsequently determined in step S2 whether there is video input. Conversely, if the capture button has not been depressed (NO in step S1), the operation waits in step S1 until the capture button is depressed (until YES in step S1).

If there is a video input (YES in step S2), a memory space available for video capturing is detected in step S3. That is, the memory space that is not used in the RAM 8 when the filtering is to be performed on the NTSC signals inputted from the VTR 44, is detected as the memory space available for video capture. Conversely, if there is no video input (NO in step S2), steps S1 and S2 are repeated until there is video input (until YES in step S2).

After the memory space available for video capture in step S3 is detected, it is determined in step S4 whether the available memory space is equal to or more than 806400 bytes. If it is equal to or more than 806400 bytes (YES in step S4), a two-frame differential processing mode is set in step S5.

If the available memory space is less than 806400 bytes (NO in step S4), it is subsequently determined in step S6 whether the available memory space is equal to or more than 403200 bytes. If it is equal to or more than 403200 bytes (YES in step S6), a two-field FIR filtering mode is set in step S7.

If the available memory space is less than 403200 bytes (NO in step S6), it is subsequently determined in step S8 whether the available memory space is equal to or more than 201600 bytes. If it is equal to or more than 201600 bytes (YES in step S8), a one-field FIR filtering mode is set in step S9.

After the color correction processing mode is set as described above, color and brightness information is extracted and inputted as digital data in step S11. The operation then returns to step S1. The color and brightness information inputted in step S11 is outputted to the PC 40 through the PC interface 38.

If the available memory space is less than 201600 bytes (NO in step S8), it means that the available memory space is less than the minimum memory space required. Therefore, an error message is displayed in step S10, and the operation returns to step S1.

In this manner, the mode of signal processing performed to extract color information and brightness information from NTSC signals using a FIR filter is changed in accordance with the memory space available for the video capture processing of input picture signals. Therefore, if the available memory space is small (less than 403200 bytes but equal to or more than 201600 bytes in this embodiment), color information is extracted from one field, that is, the minimum amount of picture signals, using the FIR filter.

If the available memory space is larger by an intermediate amount than the memory space required for one field (that is, the available memory space is equal to or more than 403200 bytes but less than 806400 bytes in this embodiment), signal extraction is performed on one frame, that is, two fields, so that one picture plane will be based on the frame. If the available memory space is larger than the memory space required for one frame (that is, the available memory space is equal to or more than 806400 bytes in this embodiment), chrominance signals are extracted through differentials between two frames, that is, four fields, so that one picture plane will be based on the two frames. Therefore, good image quality (effect of frame differentials) can be achieved. This two-frame differential processing mode for a two-frame-based picture plane is performed on a static picture.

Although the memory is used corresponding to the various functions of the multifunction apparatus, it is rare that all the functions are simultaneously operated. Therefore, by selecting a mode of converting picture signals into image data from the three different modes, in accordance with the memory space currently available for the signal conversion, the embodiment can perform extraction of color information and brightness information in an optimal manner in accordance with the available memory space while efficiently using the memory capacity. In contrast to an apparatus wherein a fixed memory is allocated for the processing of picture signals, the multifunction apparatus of the embodiment improves the picture quality by efficiently and fully using the memory capacity. In addition, since the embodiment reduces the memory capacity that needs to be provided in the multifunction apparatus, the production cost of the multifunction apparatus can be reduced.

In the embodiment, when the capture button (switch) is operated, the embodiment determines whether there is input of image information. If there is image information input, the embodiment detects a currently available memory space, and selects an appropriate signal processing mode in accordance with the available memory space. Then, the video-capturing of picture signals is performed in that mode. If the capture button has not been depressed, or if there is no image information input, the embodiment avoids performing operations related to image processing and, therefore, secures a sufficient amount of memory for the functions other than the picture signal processing.

Although the embodiment has been described in conjunction with the case where the video capture processing is performed while image data inputted by the CCD sensor 46 is retained in the RAM 8, the embodiment can also operate in substantially the same manner as described above to perform video capturing in cases where the memory of the RAM 8 is used for various other functions as described above. Furthermore, although the foregoing embodiment has a 1-MB memory capacity, the multifunction apparatus of the invention may have a larger memory capacity, for example, a memory capacity of 2 MB or greater. Further, although in the foregoing embodiment, the RAM 8 is used as a memory, it is also possible to use a predetermined add-on RAM or the like. Although the foregoing embodiment is described in conjunction with NTSC picture signals, the invention may also be applied in substantially the same manner if the picture signal system is the PAL system, the SECOM system and other systems.

It is to be understood that the invention is not restricted to the particular forms shown in the foregoing embodiment. Various modifications and alternations can be made thereto without departing from the spirit of the invention.

What is claimed is:

1. A multifunction apparatus, comprising:

reception means for receiving a picture signal;

conversion means for converting the picture signal received by the reception means into image data;

storage means for storing the image data obtained through conversion by the conversion means, the storage means being usable also for an operation other than an operation related to the conversion by the conversion means;

detection means for detecting an amount of memory space available in the storage means; and conversion mode changing means for changing a mode of conversion by the conversion means, on the basis of result of detection by the detection means, wherein the conversion means employs at least one of a two-frame differential mode in which color information and brightness information are extracted based on differentials between two frames, and a FIR filtering mode in which color information and brightness information are extracted using a FIR filter, and the conversion mode changing means sets the mode of conversion to one of the two-frame differential mode and the FIR filtering mode on the basis of the amount of available memory space in the storage means detected by the detection means, the mode of conversion being set to the two-frame differential mode if the amount of available memory space in the storage means detected by the detection means is equal to or greater than a first predetermined amount.

2. The multifunction apparatus according to claim 1, wherein the conversion mode changing means sets the mode of conversion to a two-field FIR filtering mode if the amount of available memory space in the storage means detected by the detection means is less than a first predetermined amount but greater than or equal to a second predetermined amount.

3. The multifunction apparatus according to claim 2, wherein the conversion mode changing means sets the mode of conversion to a one-field FIR filtering mode if the amount of available memory space in the storage means detected by the detection means is less than the second predetermined amount but greater than or equal to a third predetermined amount.

4. The multifunction apparatus according to claim 3, wherein the first predetermined amount is 806,400, the second predetermined amount is 403,200 bytes, and the third predetermined amount is 201,600 bytes.

5. The multifunction apparatus according to claim 3, further comprising a display, wherein when the detection means determines the amount of memory is less than the third predetermined amount, an error message is displayed on the display.

6. The multifunction apparatus according to claim 1, wherein the picture signal is a video signal.

7. A multifunction apparatus, comprising:
a receiver unit that receives a picture signal;
a converter unit that converts the picture signal received by the receiver unit into image data;
a storage unit that stores the image data obtained through conversion by the converter unit, the storage unit being usable also for an operation other than an operation related to the conversion by the converter unit;
a detector unit that detects an amount of memory space available in the storage unit; and
a conversion mode changer unit that changes a mode of conversion by the converter unit, on the basis of the detection by the detector unit, wherein the conversion mode changer unit sets the mode of conversion to one of a two-frame differential mode in which color information and brightness information are extracted based on differentials between two frames, and a FIR filtering mode in which color information and brightness information are extracted using a FIR filter, on the basis of the amount of available memory space in the storage unit detected by the detector unit, the mode of conversion being set to the two-frame differential mode if the amount of available memory space in the storage unit detected by the detector unit is equal or greater than a first predetermined amount.

8. The multifunction apparatus according to claim 7, wherein the first predetermined amount is 806,400 bytes.

9. The multifunction apparatus according to claim 7, wherein the conversion mode changer unit sets the mode of conversion to a two-field FIR filtering mode if the amount of available memory space in the storage unit detected by the detector unit is less than the first predetermined amount but greater than or equal to a second predetermined amount.

10. The multifunction apparatus according to claim 9, wherein the first predetermined amount is 806,400 bytes, and the second predetermined amount is 403,200 bytes.

11. The multifunction apparatus according to claim 7, wherein the conversion mode changer unit sets the mode of conversion to a one-field FIR filtering mode if the amount of available memory space in the storage unit detected by the detector unit is less than the first predetermined amount but greater than or equal to a second predetermined amount.

12. The multifunction apparatus according to claim 11, wherein the first predetermined amount is 403,200 bytes, and the second predetermined amount is 201,600 bytes.

13. The multifunction apparatus according to claim 9, wherein the conversion mode changer unit sets the mode of conversion to a one-field FIR filtering mode if the amount of available memory space in the storage unit detected by the detector unit is less than the second predetermined amount but greater than or equal to a third predetermined amount.

14. The multifunction apparatus according to claim 13, wherein the second predetermined amount is 403,200 bytes, and the third predetermined amount is 201,600 bytes.

15. The multifunction apparatus according to claim 13, further comprising a display, wherein when the detection means determines the amount of memory is less than the third predetermined amount, an error message is displayed on the display.

16. The multifunction apparatus according to claim 7, wherein the multifunction apparatus is a facsimile apparatus comprising a printer, an image scanner, an NCU and a modem, and the receiver unit includes a video input terminal.

17. A picture signal processing method performed by a multifunction apparatus, comprising the steps of:
receiving a picture signal;
converting the picture signal received into image data;
detecting an amount of memory space available in memory means; and
changing a mode of conversion in the converting step, on the basis of result of detection in the detecting step, wherein converting the picture signal employs at least one of a two-frame differential mode in which color information and brightness information are extracted based on differentials between two frames, and a FIR filtering mode in which color information and brightness information are extracted using a FIR filter, and changing the mode of conversion is to one of the two-frame differential mode and the FIR filtering mode on the basis of the amount of available memory space in the storage means detected by the detection means, the mode of conversion being set to the two-frame differential mode if the amount of available memory space in the storage means detected by the detection means is equal to or greater than a first predetermined amount.

18. A multifunction apparatus, comprising:
a receiver unit that receives a picture signal;
a converter unit that converts the picture signal received by the receiver unit into image data;
a storage unit that stores the image data obtained through conversion by the converter unit, the storage unit being usable also for an operation other than an operation related to the conversion by the converter unit;
a detector unit that detects an amount of memory space available in the storage unit; and
a conversion mode changer unit that changes a mode of conversion by the converter unit, on the basis of the detection by the detector unit, wherein the conversion mode changer unit sets the mode of conversion to one of a two-frame differential mode in which color information and brightness information are extracted based on differentials between two frames, and a FIR filtering mode in which color information and brightness information are extracted using a FIR filter, on the basis of the amount of available memory space in the storage unit detected by the detector unit, the conversion mode changer unit setting the mode of conversion to a two-field FIR filtering mode if the amount of available memory space in the storage unit detected by the detector unit is less than a first predetermined amount but greater than or equal to a second predetermined amount.

19. A multifunction apparatus, comprising:
a receiver unit that receives a picture signal;
a converter unit that converts the picture signal received by the receiver unit into image data;
a storage unit that stores the image data obtained through conversion by the converter unit, the storage unit being usable also for an operation other than an operation related to the conversion by the converter unit;

a detector unit that detects an amount of memory space available in the storage unit; and a conversion mode changer unit that changes a mode of conversion by the converter unit, on the basis of the detection by the detector unit, wherein the conversion mode changer unit sets the mode of conversion to one of a two-frame differential mode in which color information and brightness information are extracted based on differentials between two frames, and a FIR filtering mode in which color information and brightness information are extracted using a FIR filter, on the basis of the amount of available memory space in the storage unit detected by the detector unit, the conversion mode changer unit setting the mode of conversion to a one-field FIR filtering mode if the amount of available memory space in the storage unit detected by the detector unit is less than a first predetermined amount but greater than or equal to a second predetermined amount.

* * * * *